V. H. BROC.
ELECTRIC CONNECTOR FOR SECURELY RETAINING PLUGS.
APPLICATION FILED APR. 13, 1918.

1,275,524.

Patented Aug. 13, 1918.

Inventor:-
Victor Henri Broc
By:- B. Singh, Atty.

UNITED STATES PATENT OFFICE.

VICTOR HENRI BROC, OF LEVALLOIS-PERRET, FRANCE.

ELECTRIC CONNECTOR FOR SECURELY RETAINING PLUGS.

1,275,524.  Specification of Letters Patent.  Patented Aug. 13, 1918.

Application filed April 13, 1918. Serial No. 228,430.

*To all whom it may concern:*

Be it known that I, VICTOR HENRI BROC, a citizen of the Republic of France, residing at Levallois-Perret, Seine, France, have invented new and useful Improvements in Electric Connectors for Securely Retaining Plugs, of which the following is a specification.

My invention relates to an electric connector for securely retaining a plug; the application of same being generally made for industrial purposes and especially for motor cars and flying machines.

The drawing shows by way of example a form of the object concerning my invention.

My device comprises an external fastening or metallic housing $a$ in which operates a plunger $b$ having a rod $c$ bearing a perforation $d$ for fixing the current conducting wire. A spring $e$ is lodged around the rod $c$ and contributes to bear plunger $b$ toward the utmost opening $f$ of the housing $a$. On a side of this housing is provided a hole $g$ of sufficient size enabling the free passage through same of the spherical head $h$ of the plug $i$.

Figure 1:
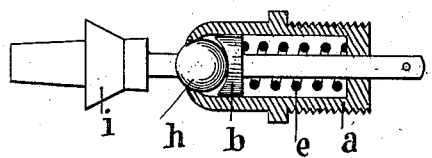
Figure 1 is a view partly in section of the whole device that is to say showing the plug in position.
Figure 2:
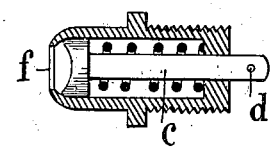
Fig. 2 is a similar view showing the plug disengaged from its fastening.
Figure 3:
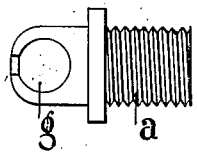
Fig. 3 is an outside view only of said fastening showing the inlet for the spherical head of the plug.
Figure 4:
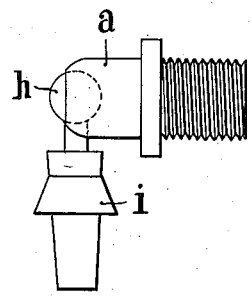
Fig. 4 is an outside view enabling one to see that the current input can be obtained as well on side as on end.

For setting this plug in position, it will be sufficient to draw on the wire fixed at the rod $c$ in order to compress the spring $e$ and disengage the hole $g$ for permitting the head $h$ of the plug to be brought into the position shown in Fig. 1 or in the one shown in Fig. 4, the spring becoming free bears against the internal face of the plunger $b$ which in its turn bears against the spherical head $h$. The current input is then insured and the plug $i$ cannot be unhooked when in position as shown in Figs. 1 and 4.

Therefore when this plug has to be taken out, it will be necessary to pull the wire for drawing on the rod $c$ and the plunger $b$ in order to compress the spring and permit the spherical head to come opposite the hole $g$ through which same has been introduced, this position being the only one in which the plug may be taken out.

What I claim is:

A metallic body or housing constituting a fastening having a threaded part presenting a central cylindrical groove and a guiding opening, a connecting piece, said guiding opening permitting the displacement of said connecting piece, said body or housing also being provided with a side inlet and a notch ending in a circular opening.

VICTOR HENRI BROC.

Witnesses:
 MARCEL VANDER HYRN,
 CHAS. P. PRESSLY.